United States Patent
Nadein et al.

(10) Patent No.: US 10,922,214 B1
(45) Date of Patent: Feb. 16, 2021

(54) SYSTEM AND METHOD FOR IMPLEMENTING A TEST OPTIMIZATION MODULE

(71) Applicant: JPMorgan Chase Bank, N.A., New York, NY (US)

(72) Inventors: Alla Nadein, Englewood Cliffs, NJ (US); Itai Wiseman, New York, NY (US); Victor M. Bonilla Pardo, Jersey City, NJ (US); Viacheslav Lisianskii, New York, NY (US); Zhi Zhang, Milburn, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 12 days.

(21) Appl. No.: 16/549,372

(22) Filed: Aug. 23, 2019

(51) Int. Cl.
*G06F 11/36* (2006.01)
*G06F 8/70* (2018.01)

(52) U.S. Cl.
CPC .......... *G06F 11/3684* (2013.01); *G06F 8/70* (2013.01); *G06F 11/3624* (2013.01); *G06F 11/3692* (2013.01)

(58) Field of Classification Search
CPC .... G06F 11/3684; G06F 8/70; G06F 11/3624; G06F 11/3692
USPC ...................................................... 717/124
See application file for complete search history.

(56) References Cited

U.S. PATENT DOCUMENTS

| | | | |
|---|---|---|---|
| 7,861,226 B1* | 12/2010 | Episkopos | G06F 11/3696 717/124 |
| 9,870,221 B2* | 1/2018 | Benedict | G06F 8/70 |
| 2008/0010542 A1* | 1/2008 | Yamamoto | G06F 11/3672 714/38.1 |
| 2014/0013307 A1* | 1/2014 | Hansson | G06F 11/3688 717/124 |
| 2016/0314056 A1* | 10/2016 | Greene | G06F 11/3664 |
| 2019/0303623 A1* | 10/2019 | Reddy | G06F 11/3692 |
| 2019/0354467 A1* | 11/2019 | Wiener | G06F 8/433 |
| 2020/0125485 A1* | 4/2020 | Wiener | G06F 8/71 |

\* cited by examiner

*Primary Examiner* — Lewis A Bullock, Jr.
*Assistant Examiner* — Theodore E Hebert
(74) *Attorney, Agent, or Firm* — Greenblum & Bernstein, P.L.C.

(57) ABSTRACT

Various methods, apparatuses/systems, and media for implementing a test optimization module are provided. A processor utilizes a static analysis technique which analyzes an application's byte code to determine what files and linenumbers have been changed in a source code based on comparing successive versions of the application. The processor creates a change dependency graph (CDG) based on a change scope and analyzed bytecode, traverses the CDG to generate a list of test cases among a plurality of test cases, accessed from a test repository, that are directly and/or indirectly related to the modification to the source code, and automatically executes only the test cases selected from the generated list to test the latest version of the application.

17 Claims, 9 Drawing Sheets

SYSTEM AND METHOD FOR IMPLEMENTING A TEST OPTIMIZATION MODULE

TECHNICAL FIELD

This disclosure generally relates to software testing, and, more particularly, to methods and apparatuses for implementing a test optimization module for drastically reducing test execution time when a modification is made to a source code.

BACKGROUND

As software application becomes increasingly more complex, testing such software application also becomes more complex as a large number of unique combinations of paths and modules may be tested for each program. Conventional tools exist for software application testing. However, as the number of tests covering an application code increases the time to verify the correctness of the code increases as well because the conventional tools execute the entire suite of tests every time a change is made (even for the smallest change) to a source code of the software application, thereby significantly increasing software application testing time, leading to a delay in getting useful feedback for developers, and wasting computer resources on build servers.

SUMMARY

The present disclosure, through one or more of its various aspects, embodiments, and/or specific features or sub-components, provides, among other features, various systems, servers, devices, methods, media, programs, and platforms for implementing a test optimization module which may implement a static analysis technique by, instead of executing all tests each time there is a code change, determining a code slice affected by the change and executing only the tests that are directly and/or indirectly related to the change, thereby significantly reducing software testing time, reducing utilization of computer resources and reducing utilization of memory spaces thereby maintaining optimum memory spaces for other computer processing algorithms, but the disclosure is not limited thereto. The various aspects, embodiments, features, and/or sub-components may also provide optimized processes of implementing a test optimization module in which a stateless engine (i.e., processor or a CPU) implemented therein may not need persistent stores, in-memory caches, and extensive synchronizations, thereby reducing utilization of computer resources and reducing utilization of memory spaces so that sufficient numbers of memory spaces may be available for other computer processing algorithms, but the disclosure is not limited thereto.

According to an aspect of the present disclosure, a method for implementing a test optimization module for automated testing of an application by utilizing one or more processors and one or more memories is disclosed. The method may include: providing a repository that stores a first version of an application and a plurality of test cases; providing a modification to a source code of the first version of the application; causing a memory to store the modified first version of the application onto the repository as a second version of the application; determining what files and line-numbers have been changed in the source code based on comparing the first and second versions of the application; generating a change scope based on the determined changed files and line-numbers in the source code; statically analyzing byte code for each test class to find all relations inside the source code affected by the modification to the source code; creating a change dependency graph (CDG) based on the change scope and analyzed bytecode; traversing the CDG to generate a list of test cases among the plurality of test cases that are directly and/or indirectly related to the modification to the source code; and automatically executing only the test cases selected from the generated list to test the second version of the application.

According to another aspect of the present disclosure, the statically analyzing byte code may include: loading test and main classes from folders with .java notation from the repository; analyzing the byte code for each test class prior to executing the second version of the application; generating a structure of the byte code and its internal dependencies in a form of nodes; and creating links between nodes that are affected by the modification to the source code.

According to yet another aspect of the present disclosure, for byte code files having *.class notation, nodes may be represented as one or more of the following: interfaces, abstract classes, and their implementations, methods, and instance and class variables.

According to a further aspect of the present disclosure: creating the CDG may further include: building the CDG based on the created links with different types of nodes.

According to an additional aspect of the present disclosure, generating the change scope may include: providing a git interface to generate a git interface command; providing a source control management (SCM) module for generating 'FROM' and 'TO' constants for the SCM; receiving a commit identification based on the generated constants; calling the git interface command to track what files and line-numbers have been changed in the source code based on the commit identification; and generating the change scope based on analyzing tracking results provided by calling the git interface command.

According to yet another aspect of the present disclosure, the 'FROM' and 'TO' constants for the SCM may include one or more of the following: latest_push that indicates most recent code version that is stored in the SCM and which is available for use to any SCM contributor; latest_commit that indicates most recent code version that is stored in the SCM and which is available for use to an author of the change; local_changes_not_committed that indicates most recent code version that hasn't been stored in the SCM; and revision_id that indicates any code version identified with a unique SCM id.

According to a further aspect of the present disclosure; creating the CDG may further include: providing a git interface to generate a git blame command; for each file name in the CDG, calling the git blame command to generate a list of Jira identifications (Jira_Ids) by line numbers corresponding to the list of test cases among the plurality of test cases that are directly and/or indirectly related to the modification to the source code; and modifying the CDG with the list of Jira_Ids as metadata.

According to an aspect of the present disclosure, a system for implementing a test optimization module for automated testing of an application is disclosed. The system may include: a source code management (SCM) system that stores versions of main and tests source files corresponding to an application; and a processor coupled to the SCM system via a communication network, wherein the processor may be configured to: construct, in a memory, a difference between a former code version of the application and a latter code version the application in the SCM system; determine what files and line-numbers have been changed in the source code based on analyzing the difference between the former code version of the application and the latter code version of the application; generate a change scope based on the determined changed files and line-numbers in the source code; statically analyze byte code for each test and main class to find all relations inside the source code affected by the modification to the source code; create a change dependency graph (CDG) based on the change scope and analyzed bytecode; traverse the CDG to generate a list of test cases among the plurality of test cases that are directly and/or indirectly related to the modification to the source code; and cause a test execution tool to execute only the test cases selected from the generated list to test the changes between the former code version of the application and the latter code version of the application.

According to another aspect of the present disclosure, the processor may be further configured to create the CDG by: analyzing the byte code for each main and test class prior to executing the latter code version of the application; and generating a structure of the change in a form of connected nodes that represent the change's direct and transient dependencies.

According to yet another aspect of the present disclosure, the processor may be further configured to create the CDG based on the created links with different types of nodes.

According to a further aspect of the present disclosure, the processor may be further configured to: provide a git interface to generate a git interface command; provide a source control management (SCM) module for generating 'FROM' and 'TO' constants for the SCM system; receive a commit identification based on the generated constants; call the git interface command to track what files and line-numbers have been changed in the source code based on the commit identification; and generate the change scope based on analyzing tracking results provided by calling the git interface command.

According to yet another aspect of the present disclosure, the processor may be further configured to perform the following to create the CDG graph: provide a git interface to generate a git blame command; for each node in the CDG, call the git blame command to generate a list of Jira identifications (Jira_Ids) by line numbers corresponding to the list of test cases among the plurality of test cases that are directly and/or indirectly related to the modification to the source code; and modify the CDG with the list of Jira_Ids as metadata.

According to an aspect of the present disclosure, a non-transitory computer readable medium configured to store instructions for implementing a test optimization module for automated testing of an application is disclosed. The instructions, when executed, may cause a processor to perform the following: providing a repository that stores a first version of an application and a plurality of test cases; providing a modification to a source code of the first version of the application; causing a memory to store the modified first version of the application onto the repository as a second version of the application; determining what files and line-numbers have been changed in the source code based on comparing the first and second versions of the application; generating a change scope based on the determined changed files and line-numbers in the source code; statically analyzing byte code for each main and test class to find all relations inside the source code affected by the modification to the source code; creating a change dependency graph (CDG) based on the change scope and analyzed bytecode; traversing the CDG to generate a list of test cases among the plurality of test cases that are directly and/or indirectly related to the modification to the source code; and automatically executing only the test cases selected from the generated list to test the second version of the application.

According to another aspect of the present disclosure, when executed, the instructions may further cause the processor to perform the following: loading test cases from folders with .java notation from the repository; statically analyzing the byte code for each main and test class prior to executing the second version of the application; generating a structure of the change in a form of connected nodes that represent the changes direct and transient dependencies; and creating links between nodes that are affected by the modification to the source code.

According to yet another aspect of the present disclosure, when executed, the instructions may further cause the processor to perform the following: providing a git interface to generate a git interface command; providing a source control management (SCM) module for generating 'FROM' and 'TO' constants for the SCM; receiving a commit identification based on the generated constants; calling the git interface command to track what files and line-numbers have been changed in the source code based on the commit identification; and generating the change scope based on analyzing tracking results provided by calling the git interface command.

According to a further aspect of the present disclosure, when executed, the instructions may further cause the processor to perform the following to create the CDG graph: providing a git interface to generate a git blame command; for each node in the CDG, calling the git blame command to generate a list of Jira identifications (Jira_Ids) by line numbers corresponding to the list of test cases among the plurality of test cases that are directly and/or indirectly related to the modification to the source code; and enriching the CDG with the list of Jira_Ids as metadata.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
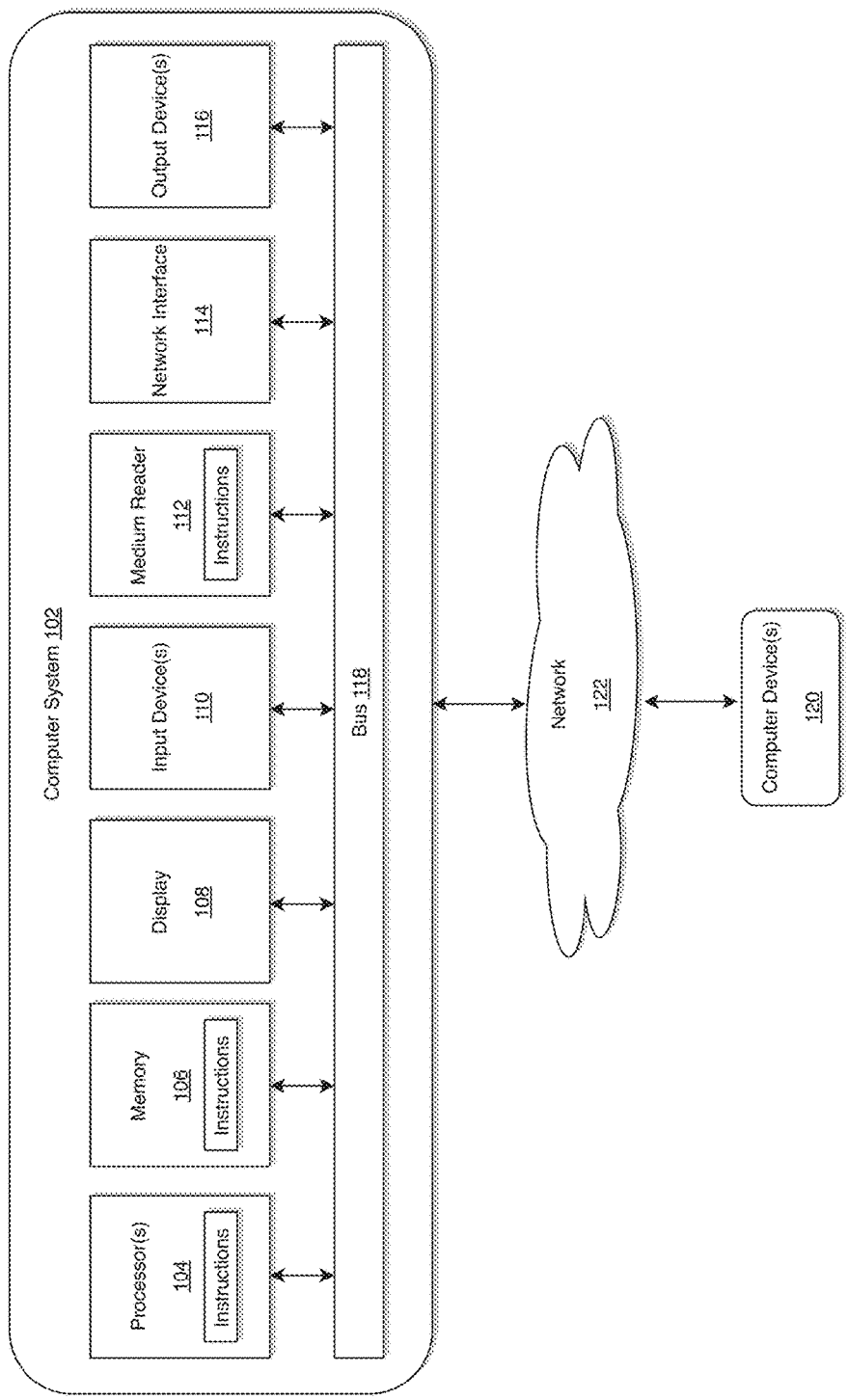
FIG. 1 illustrates a computer system for implementing a test optimization module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
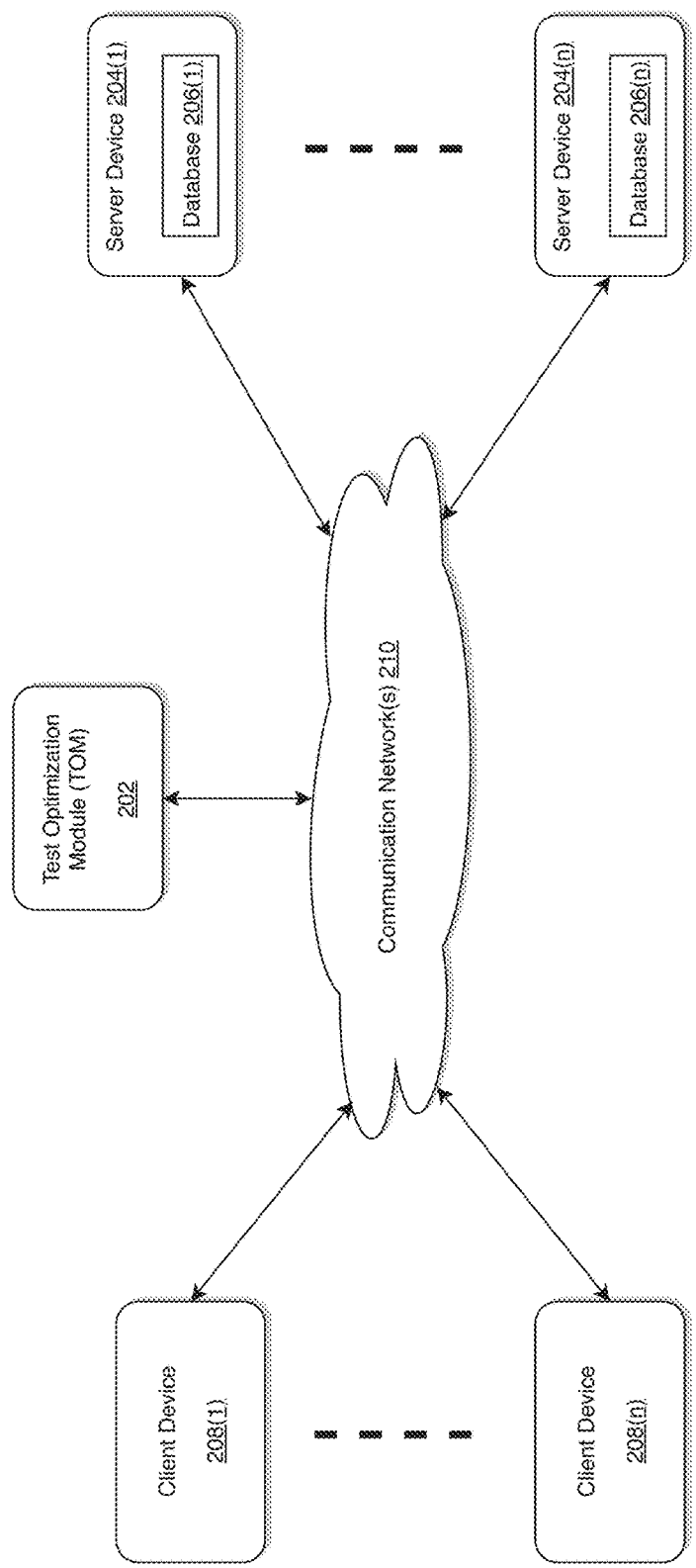
FIG. 2 illustrates an exemplary diagram of a network environment with a test optimization module in accordance with an exemplary embodiment.

Referring to FIG. 2, a schematic of an exemplary network environment 200 for implementing a test optimization module (TOM) of the instant disclosure is illustrated.

Conventional system, that does not implement a TOM of the instant disclosure, may not be able to execute testing of a software application in an efficient manner. Conventional tools may execute the entire suite of tests every time a change is made (even for the smallest change) to a source code of the software application, thereby significantly increasing software application testing time, leading to a delay in getting useful feedback for developers, and wasting computer resources on build servers.

According to exemplary embodiments, the above-described problems associated with conventional approach of testing software application may be overcome by implementing a TOM 202 as illustrated in FIG. 2 that may provide a platform for implementing the TOM 202 which may implement a static analysis technique by, instead of executing all tests each time there is a code change, determining a code slice affected by the change and executing only the tests that are directly and/or indirectly related to the change, thereby significantly reducing software testing time, reducing utilization of computer resources, and reducing utilization of memory spaces, thereby further maintaining optimum memory spaces for other computer processing algorithms, but the disclosure is not limited thereto. The various aspects, embodiments, features, and/or sub-components may also provide optimized processes of implementing the TOM 202 in which a stateless engine (i.e., processor or a CPU (central processing unit)) implemented therein may not need persistent stores, in-memory caches, and extensive synchronizations, thereby further reducing utilization of computer resources and further reducing utilization of memory spaces so that memory spaces may be available for other computer processing algorithms, but the disclosure is not limited thereto. The TOM 202 may be the same or similar to the computer system 102 as described with respect to FIG. 1.

The TOM 202 may store one or more applications that can include executable instructions that, when executed by the TOM 202, cause the TOM 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the TOM 202 itself, may be located in virtual server(s) running in a cloud-based computing environment rather than being tied to one or more specific physical network computing devices. Also, the application(s) may be running in one or more virtual machines (VMs) executing on the TOM 202. Additionally, in one or more embodiments of this technology, virtual machine(s) running on the TOM 202 may be managed or supervised by a hypervisor.

In the network environment 200 of FIG. 2, the TOM 202 is coupled to a plurality of server devices 204(1)-204(n) that hosts a plurality of databases 206(1)-206(n), and also to a plurality of client devices 208(1)-208(n) via communication network(s) 210. A communication interface of the TOM 202, such as the network interface 114 of the computer system 102 of FIG. 1, operatively couples and communicates between the TOM 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TOM 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TOM 202 may be a standalone device or integrated with one or more other devices or apparatuses, such as one or more of the server devices 204(1)-204(n), for example. In one particular example, the TOM 202 may be hosted by one of the server devices 204(1)-204(n), and other arrangements are also possible. Moreover, one or more of the devices of the TOM 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the TOM 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the TOM 202 that may efficiently provide a platform for implementing the TOM 202 which may implement a static analysis technique by, instead of executing all tests each time there is a code change, determining a code slice affected by the change and executing only the tests that are directly and/or indirectly related to the change, thereby significantly reducing software testing time, reducing utilization of computer resources and reducing utilization of memory spaces thereby further maintaining optimum memory spaces for other computer processing algorithms, but the disclosure is not limited thereto.

The client devices 208(1)-208(n) may run interface applications, such as standard web browsers or standalone client applications, which may provide an interface to communicate with the TOM 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the TOM 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TOM 202, the server devices 204(1)-204(n), or the client devices 208(1)-208(n), for example, may be configured to operate as virtual instances on the same physical machine. For example, one or more of the TOM 202, the server devices 204(1)-204(n), or the client devices 208(1)-208(n) may operate on the same physical device rather than as separate devices communicating through communication network(s) 210. Additionally, there may be more or fewer TOMs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
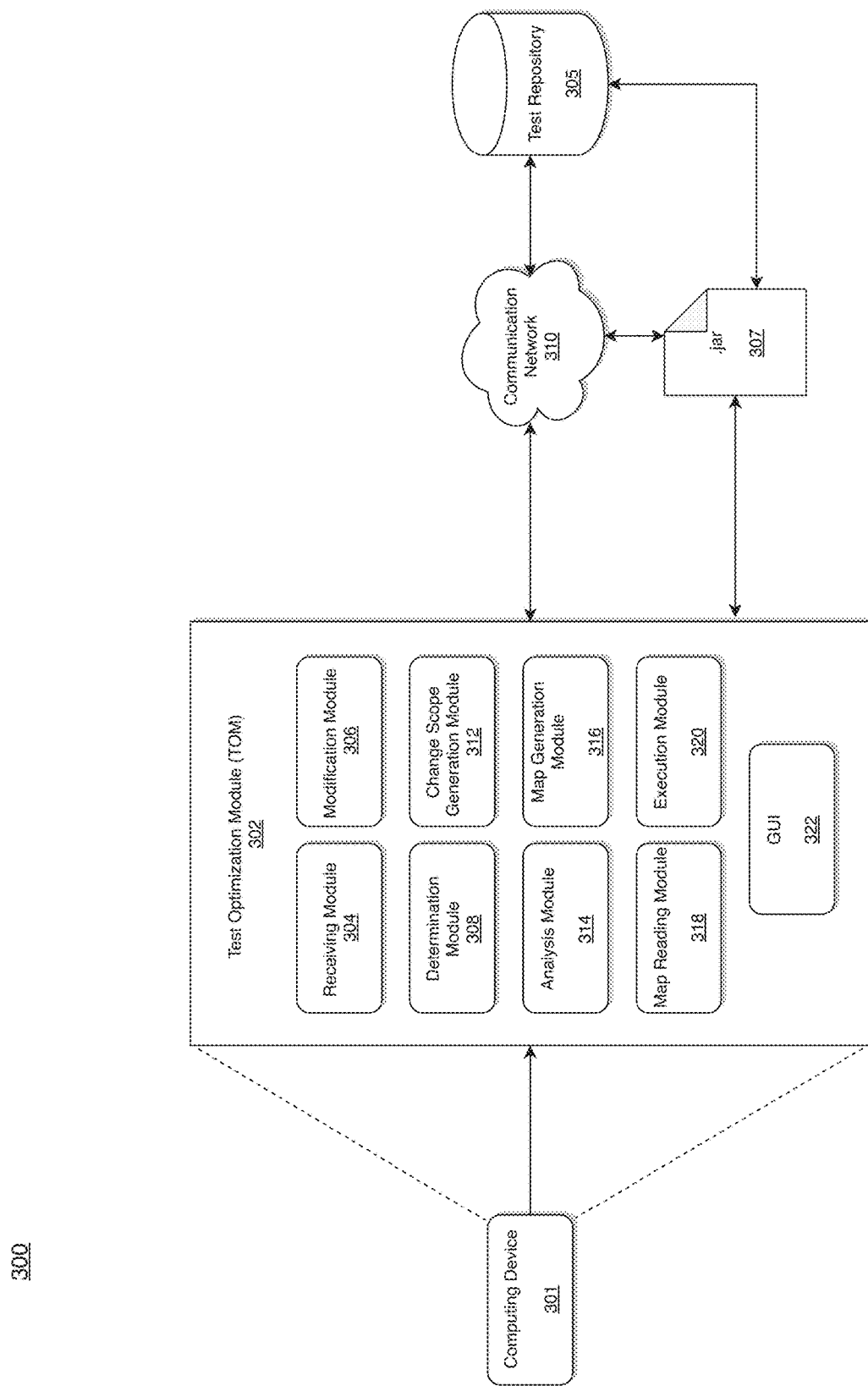
FIG. 3 illustrates a system diagram for implementing a test optimization module in accordance with an exemplary embodiment.

FIG. 3 illustrates a system diagram for implementing a test optimization module (TOM) in accordance with an exemplary embodiment. According to exemplary embodiments, a system 300 is described and shown in FIG. 3 as including a TOM 302 embedded within a computing device 301, although it may include other rules, policies, modules, databases, or applications, for example.

As will be described below, according to exemplary embodiments, the TOM 302 may be configured for applying the static Java virtual machine (JVM) byte code analysis without actually executing it. Thus, according to exemplar embodiments, the TOM 302 may be configured to build a change dependency graph (CDG), which will be describe later, in an efficient manner and detect change-related test cases/cases. Consequently, for a low penalty in time and compute resources, the TOM 302 may execute filter just-in-time and every time a change code coverage is derived. Thus, according to exemplary embodiments, a stateless engine (i.e., a processor or a CPU) implemented within the TOM 302 may not require persistent stores, in-memory caches, and extensive synchronizations, thereby additionally reducing software testing time, and reducing utilization of memory spaces, thereby improving efficiency of processing speed for other algorithms performed by the computing device 301 in parallel to software testing.

As shown in FIG. 3, an exemplary system 300 may include a computing device 301 within which the TOM 302 may be embedded, a test repository (i.e., database) 305 which may store a first version of a software application and a plurality of test cases necessary to test the software application, a .jar 307 that may include a compilation of test cases, and a communication network 310 via which the computing device 301, the TOM 302, .jar 307, and the test repository 305 are interconnected to exchange data. The test cases may be accessed from the .jar 307 and stored in the test repository 305. The computing device 301 may be the same or equivalent to the computing device 208 as illustrated in FIG. 2, the test repository 305 may include a memory (not shown) and may be the same or equivalent to the server 204 as illustrated in FIG. 2, and the communication network 310 may be the same or equivalent to the communication network 210 as illustrated in FIG. 2.

As shown in FIG. 3, the TOM 302 may include a receiving module 304, a modification module 306, a determination module 308, a change scope generation module 312, an analysis module 314, a map generation module 316, a map reading module 318, an execution module 320, and a graphical user interface (GUI) 322.

The process may be executed via the communication network 310, which may comprise plural networks as described above. For example, in an exemplary embodiment, the various components of the TOM 302 may communicate with the test repository 305 via the communication module 321 and the communication network(s) 310. Of course, these embodiments are merely exemplary and are not limiting or exhaustive.

According to exemplary embodiments, the TOM 302 may be implemented into the computing device 301 (which may be referred to as an endpoint or a target endpoint, or simply a target computing device) by configuring a source control management (SCM) module, issue tracking systems, an engine (i.e., processor or a CPU) to build a change dependency graph (CDG) for change set supplied by a Git interface (will be described later), and a series of commonly known plugins selected from the group consisting of Maven, Gradle, IntelliJ, Jules Global Library (JGL), etc., but the disclosure is not limited thereto, by utilizing the above-described modules as illustrated in FIG. 3.

According to exemplary embodiments, the receiving module 304 may be configured to receive a request for testing an application when a source code of the application is modified. The test repository 305 may be configured to store a first version of the application (i.e., original version) and a plurality of test cases related to the application. The modification module 306 may be configured to provide a modification to a source code of the first version of the application and a processor embedded within the TOM 302 may be configured to cause a memory to store the modified first version of the application onto the test repository 305 as a second version of the application (i.e., successive version(s) of the application.

According to exemplary embodiments, the determination module 308 may be configured to determine what files and line-numbers have been changed in the source code based on comparing the first and second versions of the application. According to exemplary embodiments, a change as disclosed herein may refer to all code parts directly and, most importantly, indirectly affected by the two successive versions, i.e., the first and second versions of the application, in the test repository 305, but the disclosure is not limited thereto. For example, according to exemplary embodiments, a change may be defined as a set of control flow graphs (not shown) originated by a set of code modifications. According to exemplary embodiments, a change risk may refer to the probability that a change to a software may lead to a loss caused by the software failure. According to exemplary embodiments, the probability may take into account neither the assessment of a potential loss nor the cost of risk management.

According to exemplary embodiments, the change scope generation module 312 may be configured to generate a change scope based on the changed files and line-numbers in the source code determined by the determination module 308.

According to exemplary embodiments, the analysis module 314 may be configured to statically analyze byte code for each test class to find all relations inside the source code affected by the modification to the source code. The map generation module 316 may be configured to create a change dependency graph (CDG) based on the change scope generated by the change scope generation module 312 and analyzed bytecode generated by the analysis module 314.

According to exemplary embodiments, the map reading module 318 may be configured to traverse the CDG (see, e.g., FIG. 8) to generate a list of test cases among the plurality of test cases that are directly and/or indirectly related to the modification to the source code. The execution module 320 may be configured to automatically execute only the test cases selected from the generated list to test the second version of the application. According to exemplary embodiments, the list of test cases may be displayed onto the GUI 322.

According to exemplary embodiments, the processor embedded within the TOM 302 may be further configured to load test cases from folders with .java notation from the test repository 305, the analysis module 314 may be configured to analyze the byte code for each main and test class prior to executing the second version of the application, the map generation module 316 may be configured to generate a structure of the byte code and its internal and external dependencies in a form of nodes (not shown), and create links (see, e.g., FIG. 7) between nodes that are affected by the modification to the source code.

For example, according to exemplary embodiments, the processor embedded within the TOM 302 may be further configured to create the CDG by: analyzing the byte code for each main and test class prior to executing the second/latter version of the application; and generating a structure of the change in a form of connected nodes that represent the change's direct and transient dependencies.

According to exemplary embodiments, the map generation module 316 may be configured to create the CDG based on the created links with different types of nodes, and the different types of nodes may be displayed onto the GUI 322 for easily identifying which tests should be executed to test the second version of the application without testing the entire second version of the application.

According to exemplary embodiments, the final stage of the CDG (see, e.g., FIGS. 7 and 8), may be a directed graph where the application's test cases may be found only as part of its leaves (final nodes). During building of the CDG, in addition to applying and constructing all dependencies from the source code, the map generation module 316 may mark each modified node as 'diff'. The map reading module 318 may be configured to traverse the CDG from each 'diff' and accumulate the number of edges/nodes/tests that may appear in its sub-graph.

Figure 8:
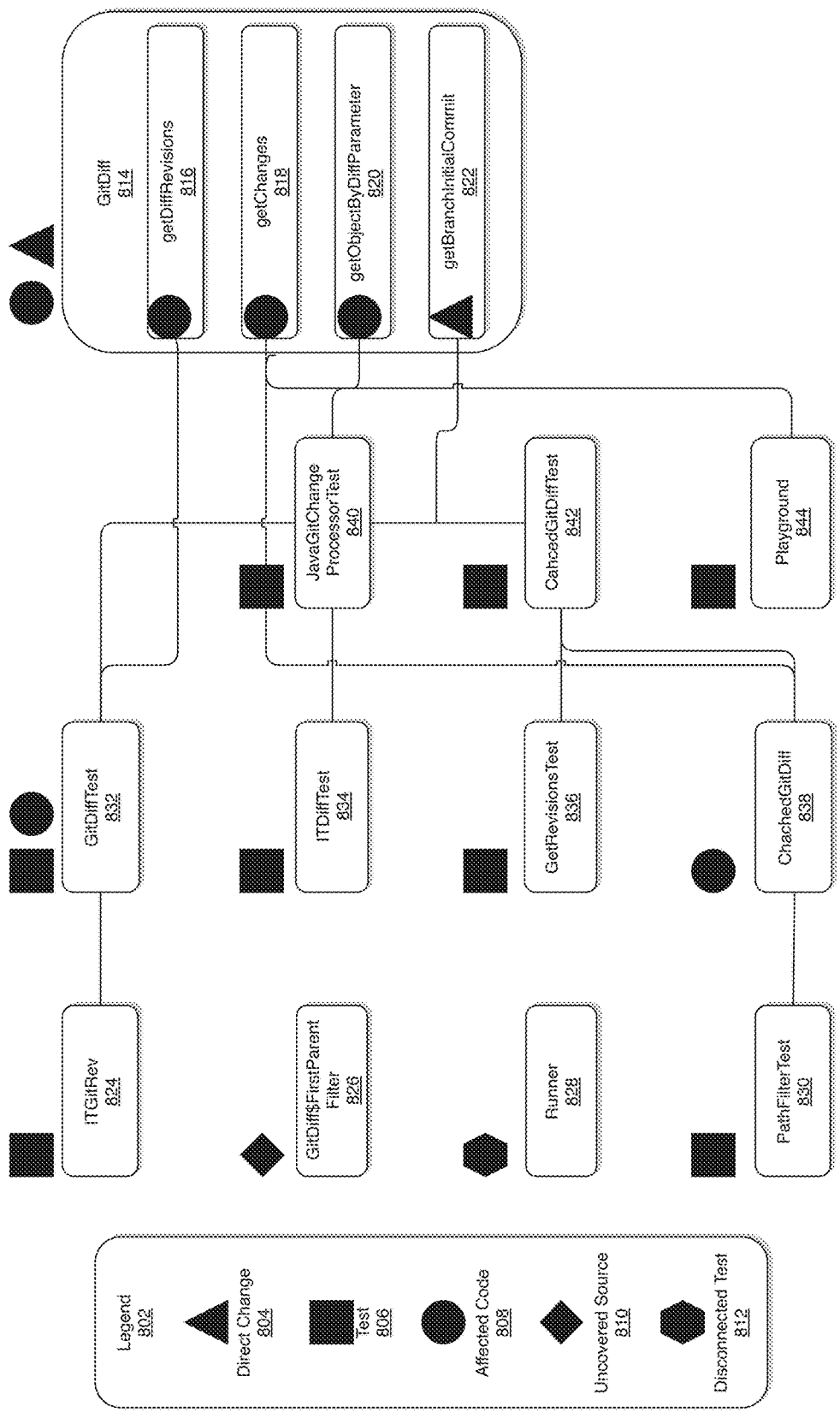
FIG. 8 illustrates another change dependency graph in accordance with an exemplary embodiment.

According to exemplary embodiments, after building the CDG map by the map generation module 316, the map reading module 318 may also initiate a code coverage process which may inspect the CDG to find direct changes and their related tests (see, e.g., FIG. 8). According to exemplary embodiments, a CDG node may be the smallest graph unit that may contain specific method, instance, or class variable and a CDG edge may refer to a call between two methods. According to exemplary embodiments, a change code coverage may be defined as a degree to which the change is executed by running tests.

According to exemplary embodiments, for byte code files having *.class notation in the .jar 307, nodes may be represented as one or more of the following: interfaces, abstract classes, and their implementations, methods, and instance and class variables, but the disclosure is not limited thereto.

According to exemplary embodiments, the TOM 302 may be further configured to: provide a git interface to generate a git interface command; provide a source control management (SCM) module for generating 'FROM' and 'TO' constants for the SCM; receive a commit identification based on the generated constants; call the git interface command to track what files and line-numbers have been changed in the source code based on the commit identification; and generate the change scope based on analyzing tracking results provided by calling the git interface command by utilizing corresponding modules as illustrated in FIG. 3.

According to exemplary embodiments, the 'FROM' and 'TO' constants for the SCM may include one or more of the following: latest_push that indicates most recent code version that is stored in the SCM and which is available for use to any SCM contributor; latest_commit that indicates most recent code version that is stored in the SCM and which is available for use to an author of the change; local_changes_not_committed that indicates most recent code version that hasn't been stored in the SCM; and revision_id that indicates any code version identified with a unique SCM id.

According to exemplary embodiments, the TOM 302 may be further configured to perform the following to create the CDG graph: provide a git interface to generate a git blame command; for each file name/node in the CDG, call the git blame command to generate a list of Jira identifications (Jira_Ids) by line numbers corresponding to the list of test cases among the plurality of test cases that are directly and/or indirectly related to the modification to the source code; and modify/enrich the CDG with the list of Jira_Ids as metadata by utilizing corresponding modules as illustrated in FIG. 3. As result, the GUI 322 may display not only related tests list to execute by the change, but list of Jira_Ids corresponding to the list of tests.

Figure 4:
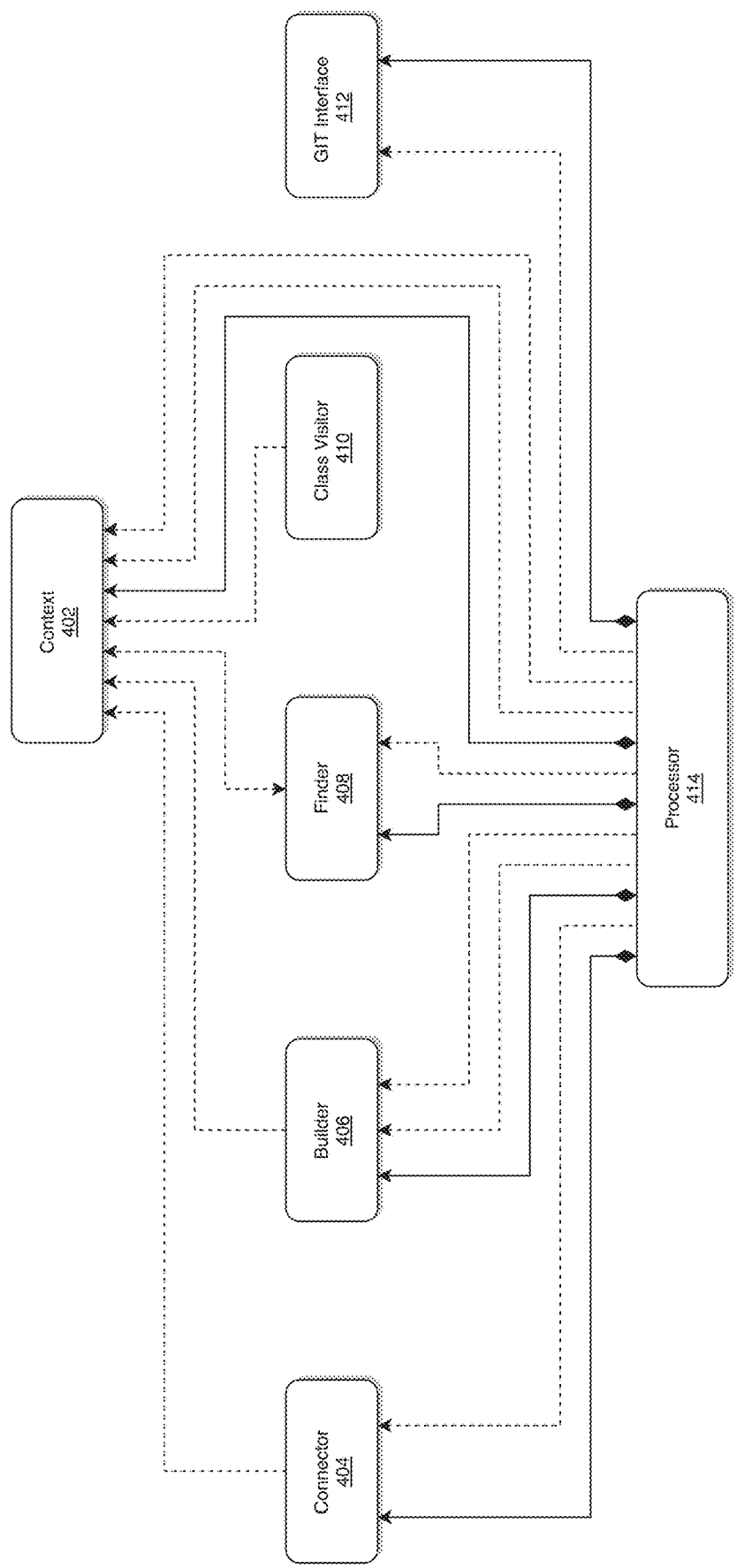
FIG. 4 illustrates a class diagram of a test optimization module in accordance with an exemplary embodiment.
Figure 5:
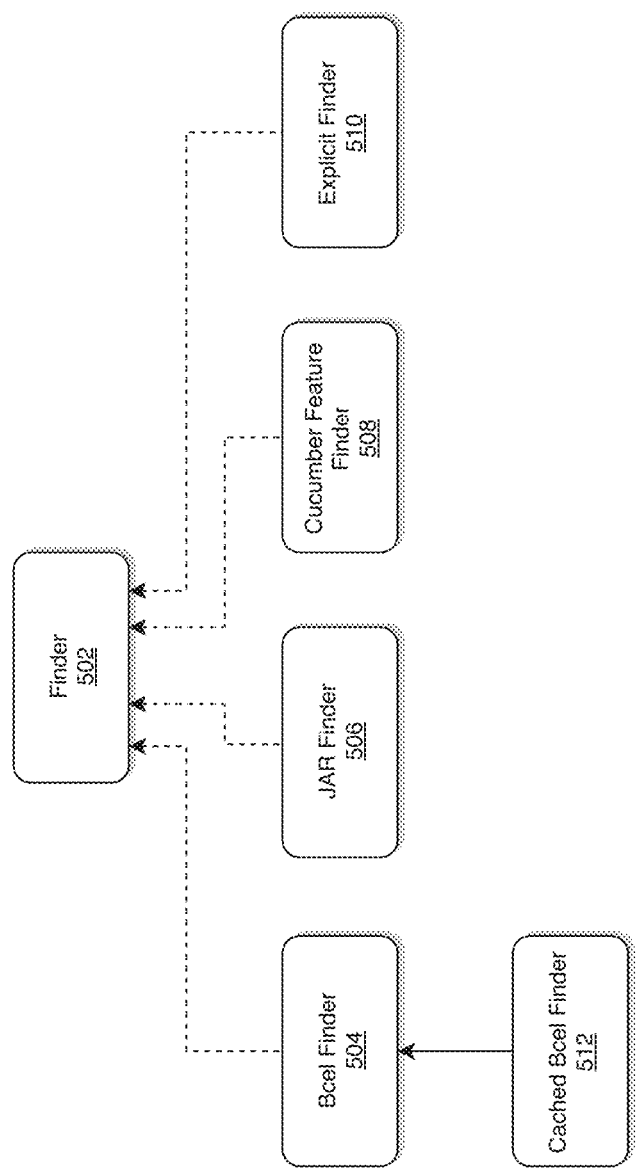
FIG. 5 illustrates a finder class diagram of a test optimization module of FIG. 4 in accordance with an exemplary embodiment.
Figure 6:
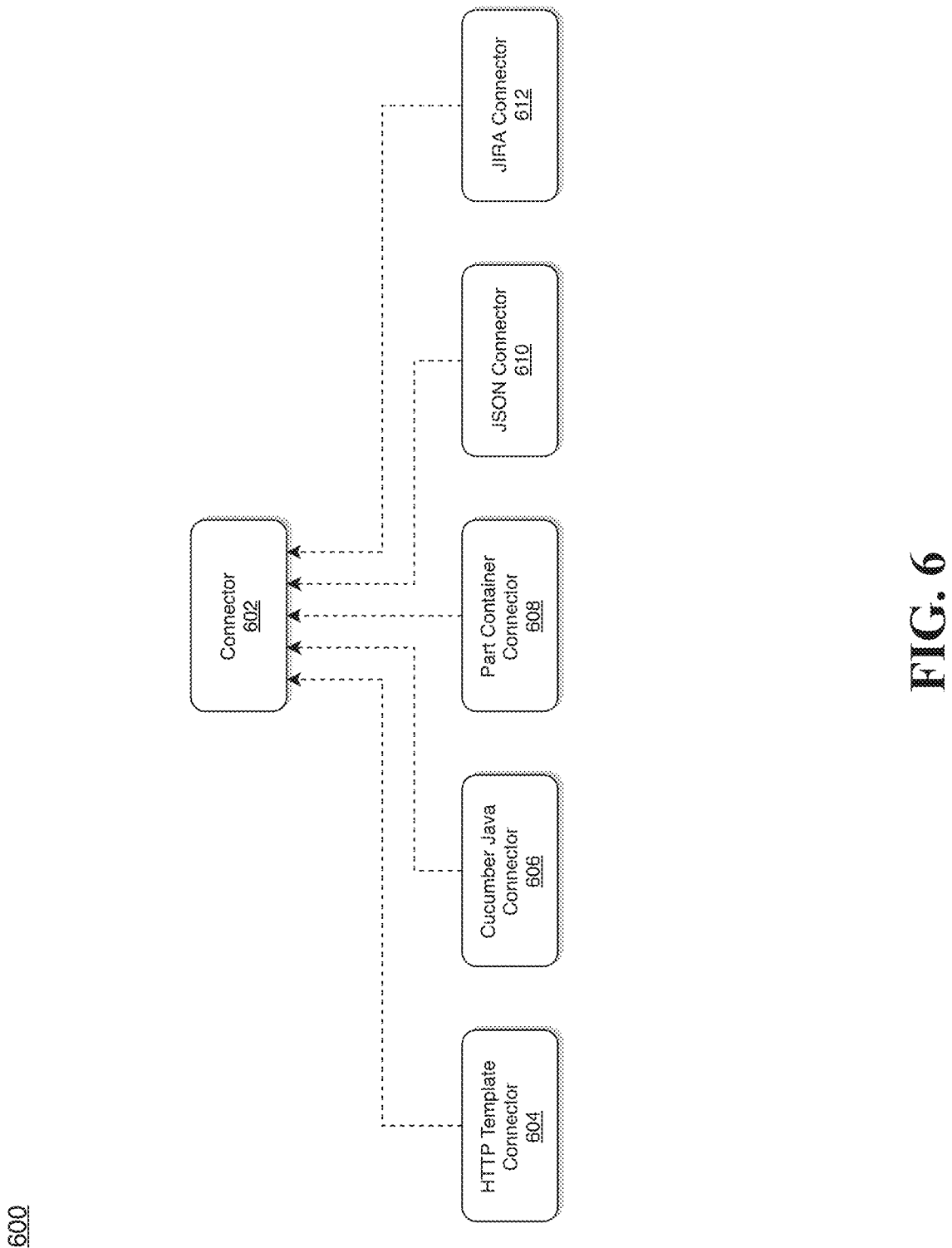
FIG. 6 illustrates a connector class diagram of a test optimization module of FIG. 4 in accordance with an exemplary embodiment.

FIG. 4 illustrates a class diagram of a test optimization module in accordance with an exemplary embodiment. FIG. 5 illustrates a finder class diagram of a test optimization module of FIG. 4 in accordance with an exemplary embodiment. FIG. 6 illustrates a connector class diagram of a test optimization module of FIG. 4 in accordance with an exemplary embodiment.

As illustrated in FIG. 4, according to exemplary embodiments, the class diagram may include a context 402, a connector 404, a builder 406, a finder 408, a class visitor 410, a GIT interface 412, and a processor 414 that are, in combination, configured to facilitate generation of the CDG by the TOM 302 illustrated above with respect to FIG. 3.

According to exemplary embodiments, the processor 414 may be implemented within the TOM 302 to coordinate between the context 402, connector 404, builder 406, finder 408, class visitor 410, and the GIT interface 412. The context 402 may be utilized for obtaining shared information about the CDG. The GIT interface 412, according to exemplary embodiments, may be a client application processing interface (API) to an SCM inspector that will be described later. The GIT interface 412 may be configured to supply a change set details, i.e., what files have been changed; change type—add, delete, rename/move, etc.; and line numbers.

According to exemplary embodiments, the finder 408 may configured to build a CDG. For example, the finder 408 may read byte code or source files and create incoming and outgoing links between nodes. According to exemplary embodiments, for byte code files (i.e., *.class), nodes are interfaces, abstract classes, and their implementations, methods, and instance and class variables. According to exemplary embodiments, nodes constructed from source files may be Cucumber feature and scenario names or HTTP URLs from Selenium tests.

According to exemplary embodiments, as illustrated in FIG. 5, the finder 502 may be a finder class as illustrated in FIG. 4. As illustrated in FIG. 5, the finder 502 may be configured to receive information from a Bcel finder 504, a JAR finder 506, a Cucumber feature finder 508, and an explicit finder 510. According to exemplary embodiments, the Bcel finder 504 may be configured to receive information from a cached Bcel finder 512.

According to exemplary embodiments, the Cucumber feature finder 508 may be configured to find Cucumber tests and links them to the CDG. The explicit finder 510 following a precautionary principle, may create links between classes, methods, variables that were manually described.

Figure 7:
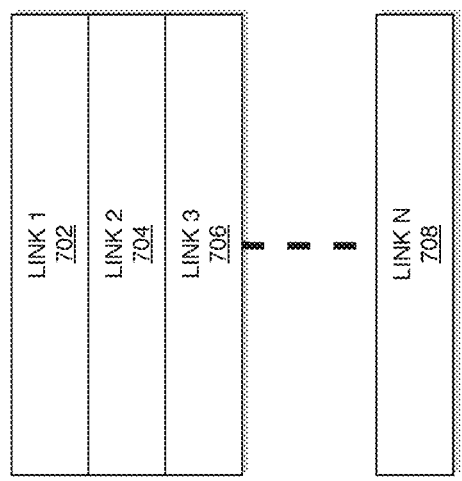
FIG. 7 illustrates a change dependency graph in accordance with an exemplary embodiment.

According to exemplary embodiments, the Bcel finder 504 may be configured to build the CDG and while doing so, may link all tests that have been implemented by a JUnit. According to exemplary embodiments, the Bcel finder 504 may be leveraged to read byte code and build relationships between entities to create the CDG. For example, FIG. 7 illustrates an exemplary CDG 700 that has been created by linking Link 1 702, link 2 704, link 3 706 up to link N 708, but the disclosure is not limited thereto.

According to exemplary embodiments, the JAR finder 506 may be configured to link test cases supplied in .jar files (e.g., .jar 307 as illustrated in FIG. 3) on the class path to the CDG. As exemplary class path to the CDG has been illustrated in FIG. 8.

As illustrated in FIG. 4, according to exemplary embodiments, after finder 408 has completed its operations in accordance with the finder class diagram illustrated with respect to FIG. 5, a connector class may enrich the CDG. According to exemplary embodiments, the connector class may be the connector 404 as illustrated in FIG. 4. The connector class may include a plurality of connector classes (see FIG. 6). Most of these connector classes may create link between the main code and non-JUnit tests that byte code inspection could not identify. Some of these connector classes may enrich the nodes with commit-level information.

For example, as illustrated in FIG. 6, the connector class (i.e., connector 602) may receive information from an HTTP template connector 604, a Cucumber Java connector 606, a part container connector 608, a JSON connector 610, and a JIRA connector 612 to enrich the CDG created by the TOM 302. According to exemplary embodiments, the part container connector 608 may be configured to create a supporting vertex that represents the container (i.e., the application) where all other nodes reside. The part container connector 608 may be utilized to identify disconnected tests—those that the TOM 302 could not safely identify as not related to the change. The HTTP template connector 604 may be configured to add tests that interact with main code base via HTTP APIs to the CDG generated by the TOM 302. The Cucumber Java connector 606 may be configured to add tests that implement Cucumber features to the CDG generated by the TOM 302. The JSON connector 610 may be configured to add Selenium tests to the CDG. The JIRA connector 612 may be configured to enrich each node with the Jira ID against which the last node change was made. For example, if method A was modified three times against Jira 1, 2, 3 in that order, the node that represents the method A will contain metadata that describes Jira 3.

As is well known in the art, Java, being a cross-platform language, may achieve its interoperability through an abstraction layer in the way of a binary format named byte code. While the actual process of building the intermediate layer may be performed by a compiler, and the execution itself may be done by the Java Virtual Machine (JVM) through .class files, there may be often a need to inspect and even modify the compiled byte code for purposes of optimization or run-time analysis. A Byte code engineering library (Bcel) provides a comprehensive API for these tasks.

As illustrated in FIG. 4, according to exemplary embodiments, the class visitor 410 may be utilized by the finder 408 to construct a CDG. The class visitor 410 may include a plurality of class visitors and these class visitors may be configured to seamlessly integrate Bcel finder 504 illustrated in FIG. 5 to traverse and analyze the class files contents.

According to exemplary embodiments, each class visitor within the class visitor 410 may delegate work to one or more method visitors. According to exemplary embodiments, the key class visitors may include: Test Class Visitor, Spring Controller Class Visitor, Javax Controller Class Visitor, Affected Class Visitor, Caller Class Visitor, and Implementing Class Visitor, but the disclosure is not limited thereto.

According to exemplary embodiments, the Test Class Visitor may be configured to link init/destroy methods (i.e., init-method and destroy-method as attribute in TOM 302 configuration to perform certain actions upon initialization and destruction) annotated with standard JUnit annotations to the CDG created by the TOM 302. The Spring Controller Class Visitor may be configured to link methods and variables annotated with Spring annotations. The Javax Controller Class Visitor may be configured to link methods and variables annotated with Javax annotations. The Affected Class Visitor may be configured to delegate class changes to the method visitor. The Caller Class Visitor may be configured to traverse a byte code and relate line numbers supplied in a git change set to the class methods. The Caller Class Visitor may be further configured to build links between the modified method and methods/fields the modified method relies on (see, e.g., FIGS. 7 and 8). The Implementing Class Visitor may be configured to link methods in each interface inherited by a class (see e.g., FIGS. 7 and 8).

FIG. 7 illustrates a change dependency graph in accordance with an exemplary embodiment. As illustrated in FIG. 7, the GUI 322 may be configured to display the change dependency graph 700 as a combination of LINK 1 702, LINK 2 704, LINK3 706 up to LINK N 708, but the disclosure is not limited thereto. According to exemplary embodiments, the CDG may be created by as few as two links depending on a change scope.

FIG. 8 illustrates another change dependency graph in accordance with an exemplary embodiment. As illustrated in FIG. 8, the GUI 322 may be configured to display the change dependency graph as a combination of various legends, but the disclosure is not limited thereto. As illustrated in FIG. 8, the legend 802 may include a black solid triangular legend 804 to illustrate a direct change made to a code, a black solid square legend 806 to illustrate test, a black solid circular legend 808 to illustrate affected code due to the change code, a black solid diamond legend 810 to illustrate uncovered source, and a black solid hexagonal legend 812 to illustrate disconnected test, but the disclosure is not limited thereto. For example, other legends and/or color combinations may be utilized to illustrate a direct change, test, affected code, uncovered source and disconnected test.

As illustrated in FIG. 8, the GitDiff 814 illustrates an example of what method node has been directly changed and what method nodes are affected by the changed node. For example, the change dependency graph 800 illustrates that the method node getBranchInitialCommit 822 has been directly changed and all of method nodes getDiffRevisions 816, getChanges 818, getObjectByDiffParameter 820 are affected by the changed node of getBranchInitialCommit 822. FIG. 8 also illustrates that all of nodes ITGitRev 824, PathFilterTest 830, GitDiffTest 832, ITDiffTest 834, GetRevisionsTest 836, JavaGitChangeProcessorTest 840, ChachedGitDiffTest 842, and playground 844 are related tests by this change that should be executed by the execution module 320 for testing the second version of the application. Also, the node GetDiff$FirstParentFilter 826 representing that the FirstParentFilter class has been added and there is no test-case to cover this class. Thus, the node GetDiff$FirstParentFilter 826 has been illustrated as uncovered source. Furthermore, FIG. 8 illustrates that both the GitDiffTest 832 and the ChachedGitDiff 838 are affected code. Thus, according to exemplary embodiments, the CDG 800 as illustrated in FIG. 8 would facilitate detecting all change-related tests and coverage very quickly and executing only those tests that are directly and/or indirectly related to the modification made to the source code, thereby significantly reducing software testing time, reducing utilization of computer resources and reducing utilization of memory spaces thereby maintaining optimum memory spaces for other computer processing algorithms to be performed in parallel to the software testing.

Figure 9:
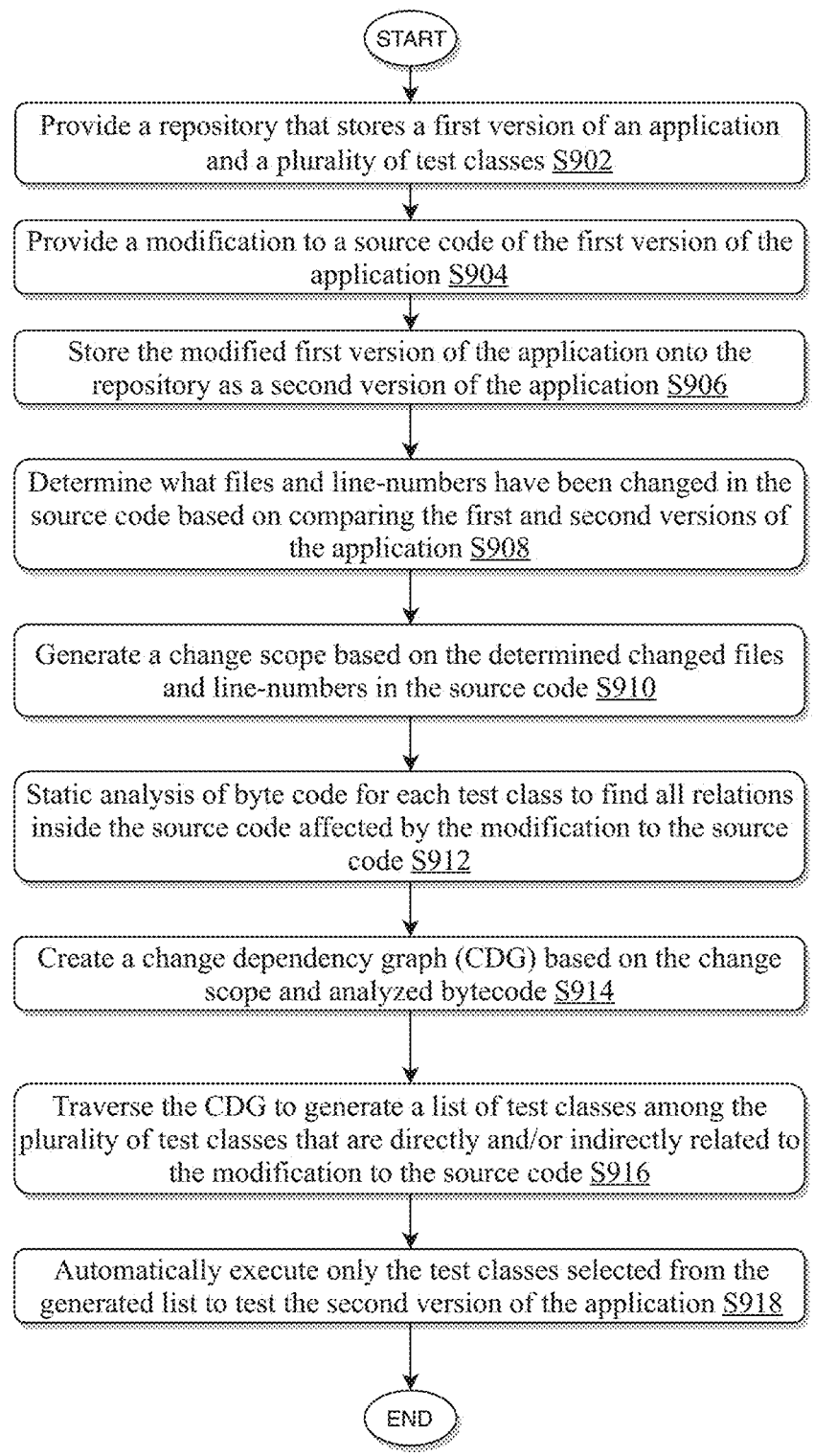
FIG. 9 illustrates a flow chart of a process for implementing a test optimization module in accordance with an exemplary embodiment.

FIG. 9 illustrates a flow chart of a process 900 for implementing a test optimization module in accordance with an exemplary embodiment. The test optimization module may be the TOM 302 as illustrated in FIG. 3.

At step S902, a repository is provided. According to exemplary embodiments, the repository may be the same or similar to the test repository 305 as illustrated in FIG. 3. The repository may be configured to store a first version of an application and a plurality of test cases.

At step S904, a modification to a source code of the first version of the application may be provided.

At step S906, the TOM 302 may cause a memory to store the modified first version of the application onto the repository as a second version of the application.

At step S908, the TOM 302 may determine what files and line-numbers have been changed in the source code based on comparing the first and second versions of the application.

At step S910, a change scope based on the determined changed files and line-numbers in the source code may be determined. An exemplary change scope may be represented by the following table:

TABLE

| |
|---|
| [INFO] Revision scope: FROM: commit 478bedf937f46d8add38db9bc96436ed24728d09 1561658659 - - - - -p, TO: AnyObjectId[0000000000000000000000000000000000000000] [INFO] Found changes: com/jpmorgan/cib/core/sandboni/scm/git/diff/GitDiff.java:ADD:[256, 257, 258, 259, 36, 260, 261, 262, 263, 264, 25, 252, 253, 254, 255] com/jpmorgan/cib/core/sandboni/scm/git/diff/GitDiff.java:MODIFY:[210, 211, 212, 213, 214, 215, 216, 217, 218, 219, 220, 221, 222, 223, 224, 225, 226, 227] |

At step S912, an analysis module embedded within the TOM 302 may statically analyze byte code for each test class to find all relations inside the source code affected by the modification to the source code.

At step S914, a change dependency graph (CDG) may be created based on the change scope and the analyzed byte-code.

At step S916, the CDG may be traversed to generate a list of test cases among the plurality of test cases that are directly and/or indirectly related to the modification to the source code. The list of test cases may be displayed onto the GUI 322.

At step S918; only the test cases selected from the generated list may be automatically executed to test the second version of the application.

According to exemplary embodiments, the process of statically analyzing byte code at step S912 may further include: loading test cases from folders with .java notation from the repository; analyzing the byte code for each test class prior to executing the second version of the application; generating a structure of the byte code and its internal and external dependencies in a form of nodes; and creating links between nodes that are affected by the modification to the source code.

According to exemplary embodiments, the process of creating a CDG may further include: building the CDG based on the created links with different types of nodes.

According to exemplary embodiments, the process of generating a change scope may further include: providing a git interface to generate a git interface command; providing a source control management (SCM) module for generating 'FROM' and 'TO' constants for the SCM; receiving a commit identification based on the generated constants; calling the git interface command to track what files and line-numbers have been changed in the source code based on the commit identification; and generating the change scope based on analyzing tracking results provided by calling the git interface command.

According to exemplary embodiments, the process of creating a change dependency CDG graph may further include: providing a git interface to generate a git blame command; for each file name in the CDG, calling the git blame command to generate a list of Jira identifications (Jira_Ids) by line numbers corresponding to the list of test cases among the plurality of test cases that are directly and/or indirectly related to the modification to the source code; and modifying the CDG with the list of Jira_Ids as metadata.

Thus, the exemplary embodiments disclosed herein with reference to FIGS. 1-9 may provide platforms for implementing a test optimization module which may implement a static analysis technique by, instead of executing all tests each time there is a code change, determining the code slice affected by the change and executing only the tests that are directly and/or indirectly related to the change, thereby significantly reducing software testing time, reducing utilization of computer resources and reducing utilization of memory spaces thereby maintaining optimum memory spaces for other computer processing algorithms, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a test optimization module for automated testing of an application by utilizing one or more processors and one or more memories, the method comprising:
providing a repository that stores a first version of an application and a plurality of test cases;
providing a modification to a source code of the first version of the application;
causing a memory to store the modified first version of the application onto the repository as a second version of the application;
determining what files and line-numbers have been changed in the source code based on comparing the first and second versions of the application;
generating a change scope based on the determined changed files and line-numbers in the source code;
statically analyzing byte code for each test class to find all relations inside the source code affected by the modification to the source code;
creating a change dependency graph (CDG) based on the change scope and the analyzed bytecode;
traversing the CDG to generate a list of test cases among the plurality of test cases that are directly and/or indirectly related to the modification to the source code; and
automatically executing only the test cases selected from the generated list to test the second version of the application,
wherein creating the CDG further comprises:
providing a git interface to generate a git blame command;
for each node in the CDG, calling the git blame command to generate a list of Jira identifications (Jira_Ids) by line numbers corresponding to the list of test cases among the plurality of test cases that are directly and/or indirectly related to the modification to the source code; and
enriching the CDG with the list of Jira_Ids as metadata.

2. The method according to claim 1, wherein the statically analyzing byte code comprises:
loading test and main classes from folders with .java notation from the repository;
analyzing the byte code for each test class prior to executing the second version of the application;
generating a structure of the byte code and its internal dependencies in a form of nodes; and
creating links between nodes that are affected by the modification to the source code.

3. The method according to claim 2, wherein for byte code files having *.class notation, nodes represent one or more of the following: interfaces, abstract classes, and their implementations, methods, and instance and class variables.

4. The method according to claim 2, wherein creating the CDG further comprises:
building the CDG based on the created links with different types of nodes.

5. The method according to claim 1, wherein generating the change scope comprises:
providing a git interface to generate a git interface command;
providing a source control management (SCM) module for generating 'FROM' and 'TO' code revisions stored in SCM;
receiving a commit identification based on the generated constants;
calling the git interface command to track what files and line-numbers have been changed in the source code based on the commit identification; and
generating the change scope based on analyzing tracking results provided by calling the git interface command.

6. The method according to claim 5, wherein the 'FROM' and 'TO' constants for the SCM includes one or more of the following:
latest_push that indicates most recent code version that is stored in the SCM and which is available for use to any SCM contributor;
latest_commit that indicates most recent code version that is stored in the SCM and which is available for use to an author of the change;
local_changes_not_committed that indicates most recent code version that hasn't been stored in the SCM; and
revision_id that indicates any code version identified with a unique SCM id.

7. A system for implementing a test optimization module for automated testing of an application, the system comprising:
a source code management (SCM) system that stores versions of main and tests source files corresponding to an application; and
a processor coupled to the SCM system via a communication network, wherein the processor is configured to:
construct, in a memory, a difference between a former code version of the application and a latter code version of the application in the SCM system;
determine what files and line-numbers have been changed in a source code based on analyzing the difference between the former code version of the application and the latter code version of the application;
generate a change scope based on the determined changed files and line-numbers in the source code;
statically analyze byte code for each test and main class to find all relations inside the source code affected by a modification to the source code;
create a change dependency graph (CDG) based on the change scope and analyzed bytecode;
traverse the CDG to generate a list of test cases among the plurality of test cases that are directly and/or indirectly related to the modification to the source code; and
cause a test execution tool to execute only the test cases selected from the generated list to test the changes between the former code version of the application and the latter code version of the application,
wherein the processor is further configured to perform the following to create the CDG graph:
provide a git interface to generate a git blame command;
for each node in the CDG, call the git blame command to generate a list of Jira identifications (Jira_Ids) by line numbers corresponding to the list of test cases among the plurality of test cases that are directly and/or indirectly related to the modification to the source code; and
modify the CDG with the list of Jira_Ids as metadata.

8. The system according to claim 7, wherein the processor is further configured to create the CDG by:

analyzing the byte code for each main and test class prior to executing the latter code version of the application; and generating a structure of the change in a form of connected nodes that represent the change's direct and transient dependencies.

9. The system according to claim 8, wherein for byte code files having *.class notation, nodes are represented as one or more of the following: interfaces, abstract classes, and their implementations, methods, and instance and class variables.

10. The system according to claim 8, wherein the processor is further configured to create the CDG based on the created links with different types of nodes.

11. The system according to claim 7, wherein the processor is further configured to:
provide a git interface to generate a git interface command;
provide a source control management (SCM) module for generating 'FROM' and 'TO' constants for the SCM system;
receive a commit identification based on the generated constants;
call the git interface command to track what files and line-numbers have been changed in the source code based on the commit identification; and
generate the change scope based on analyzing tracking results provided by calling the git interface command.

12. The system according to claim 11, wherein the 'FROM' and 'TO' constants for the SCM includes one or more of the following:
latest_push that indicates most recent code version that is stored in the SCM and which is available for use to any SCM contributor;
latest_commit that indicates most recent code version that is stored in the SCM and which is available for use to an author of the change; and
local_changes_not_committed that indicates most recent code version that hasn't been stored in the SCM.

13. A non-transitory computer readable medium configured to store instructions for implementing a test optimization module for automated testing of an application, wherein, when executed, the instructions cause a processor to perform the following:
providing a repository that stores a first version of an application and a plurality of test cases;
providing a modification to a source code of the first version of the application;
causing a memory to store the modified first version of the application onto the repository as a second version of the application;
determining what files and line-numbers have been changed in the source code based on comparing the first and second versions of the application;
generating a change scope based on the determined changed files and line-numbers in the source code;
statically analyzing byte code for each main and test class to find all relations inside the source code affected by the modification to the source code;
creating a change dependency graph (CDG) based on the change scope and the analyzed bytecode;
traversing the CDG to generate a list of test cases among the plurality of test cases that are directly and/or indirectly related to the modification to the source code; and automatically executing only the test cases selected from the generated list to test the second version of the application,
wherein, when executed, the instructions further cause the processor to perform the following to create the CDG graph:
providing a git interface to generate a git blame command;
for each node in the CDG, calling the git blame command to generate a list of Jira identifications (Jira_Ids) by line numbers corresponding to the list of test cases among the plurality of test cases that are directly and/or indirectly related to the modification to the source code; and
enriching the CDG with the list of Jira_Ids as metadata.

14. The non-transitory computer readable medium according to claim 13, wherein, when executed, the instructions further cause the processor to perform the following:
loading test cases from folders with .java notation from the repository;
statically analyzing the byte code for each main and test class prior to executing the second version of the application;
generating a structure of the change in a form of connected nodes that represent the change's direct and transient dependencies; and
creating links between nodes that are affected by the modification to the source code.

15. The non-transitory computer readable medium according to claim 14, wherein for byte code files having *.class notation, nodes are represented as one or more of the following: interfaces, abstract classes, and their implementations, methods, and instance and class variables.

16. The non-transitory computer readable medium according to claim 13, wherein, when executed, the instructions further cause the processor to perform the following:
providing a git interface to generate a git interface command;
providing a source control management (SCM) module for generating 'FROM' and 'TO' constants for the SCM;
receiving a commit identification based on the generated constants;
calling the git interface command to track what files and line-numbers have been changed in the source code based on the commit identification; and
generating the change scope based on analyzing tracking results provided by calling the git interface command.

17. The non-transitory computer readable medium according to claim 16, wherein the 'FROM' and 'TO' constants for the SCM includes one or more of the following:
latest_push that indicates most recent code version that is stored in the SCM and which is available for use to any SCM contributor;
latest_commit that indicates most recent code version that is stored in the SCM and which is available for use to an author of the change; and
local_changes_not_committed that indicates most recent code version that hasn't been stored in the SCM.

* * * * *